US011544274B2

(12) United States Patent
Yazdian et al.

(10) Patent No.: US 11,544,274 B2
(45) Date of Patent: Jan. 3, 2023

(54) CONTEXT-BASED DIGITAL ASSISTANT

(71) Applicant: Disney Enterprises, Inc., Burbank, CA (US)

(72) Inventors: Afsoun R. Yazdian, Sherman Oaks, CA (US); Michelle Blanken, Canyon Country, CA (US); Olivia K. De Carlo, Sherman Oaks, CA (US); Theodore Wei-Yun Leung, Bainbridge Island, WA (US)

(73) Assignee: Disney Enterprises, Inc., Burbank, CA (US)

( * ) Notice: Subject to any disclaimer, the term of this patent is extended or adjusted under 35 U.S.C. 154(b) by 1184 days.

(21) Appl. No.: 15/653,230

(22) Filed: Jul. 18, 2017

(65) Prior Publication Data

US 2018/0018373 A1 Jan. 18, 2018

Related U.S. Application Data

(60) Provisional application No. 62/363,679, filed on Jul. 18, 2016.

(51) Int. Cl.
*G06F 16/2457* (2019.01)
*G06F 16/2452* (2019.01)
*G06F 16/2453* (2019.01)
*G06Q 10/10* (2012.01)

(52) U.S. Cl.
CPC .. *G06F 16/24573* (2019.01); *G06F 16/24522* (2019.01); *G06F 16/24532* (2019.01); *G06F 16/24575* (2019.01); *G06Q 10/10* (2013.01)

(58) Field of Classification Search
CPC ......... G06F 16/24575; G06F 16/24532; G06F 16/24573; G06F 16/24522; G06Q 10/10
See application file for complete search history.

(56) References Cited

U.S. PATENT DOCUMENTS

| 10,068,257 B1* | 9/2018 | Mosthaf | G06Q 30/0631 |
| 2013/0095460 A1* | 4/2013 | Bishop | G09B 5/06 |
| | | | 434/308 |
| 2013/0297402 A1* | 11/2013 | Chen | G06Q 30/02 |
| | | | 705/14.39 |
| 2015/0262425 A1* | 9/2015 | Hastings | G02B 27/0172 |
| | | | 345/633 |
| 2016/0214481 A1* | 7/2016 | Othmer | B60K 35/00 |
| 2016/0234595 A1* | 8/2016 | Goran | H04L 12/2827 |
| 2016/0269712 A1* | 9/2016 | Ostrover | H04S 7/302 |

(Continued)

*Primary Examiner* — Irete F Ehichioya
*Assistant Examiner* — Ken Hoang
(74) *Attorney, Agent, or Firm* — Patterson + Sheridan, LLP

(57) ABSTRACT

An electronic device that includes one or more input sensor devices, one or more output devices, one or more computer processors and a memory containing computer program code that, when executed by operation of the one or more computer processors, performs an operation. The operation includes collecting information, using one or more input sensor devices, about the plurality of users within a physical environment. The operation includes analyzing the collected information to determine a present situational context for the plurality of users that are currently present within the physical environment. An action to perform is determined based on the determined present situational context. The determined action is executed using the one or more output devices.

20 Claims, 5 Drawing Sheets

(56) References Cited

U.S. PATENT DOCUMENTS

| | | | |
|---|---|---|---|
| 2017/0055032 A1* | 2/2017 | Oshima | H04N 21/25891 |
| 2017/0230694 A1* | 8/2017 | Shaw | H04N 21/251 |
| 2017/0323340 A1* | 11/2017 | Jeon | G06Q 30/0261 |
| 2017/0340256 A1* | 11/2017 | Suskind | A61B 5/4803 |
| 2017/0374414 A1* | 12/2017 | Knox | H04N 21/44218 |
| 2018/0218199 A1* | 8/2018 | Li | G05B 15/02 |

\* cited by examiner

CONTEXT-BASED DIGITAL ASSISTANT

CROSS-REFERENCE TO RELATED APPLICATIONS

This application claims benefit of U.S. provisional patent application Ser. No. 62/363,679 filed Jul. 18, 2016, which is herein incorporated by reference in its entirety.

BACKGROUND

Field of the Invention

Embodiments of the present disclosure generally relate to the field of intelligent assistants, and more particularly, to techniques for providing a context-sensitive intelligent assistant that can serve multiple users simultaneously.

Description of the Related Art

Current work on intelligent assistants focuses on assisting a single user. Such systems can serve only one user at a time, and are not generally as capable or dynamic as an actual human assistant is. Moreover, many groups of individuals (e.g., families) would benefit from the assistance of a multi-user assistant, but many such groups cannot afford an actual human assistant and no satisfactory intelligent assistants exist.

SUMMARY

Embodiments provide an electronic device, method and computer-readable medium for providing a digital assistant to a group of users. The electronic device, method and computer-readable medium can include collecting information, using one or more input sensor devices, about the plurality of users within a physical environment. The electronic device, method and computer-readable medium further include analyzing the collected information to determine a present situational context for the plurality of users that are currently present within the physical environment. The electronic device, method and computer-readable medium include determining an action to perform based on the determined present situational context and executing the determined action using the one or more output devices.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
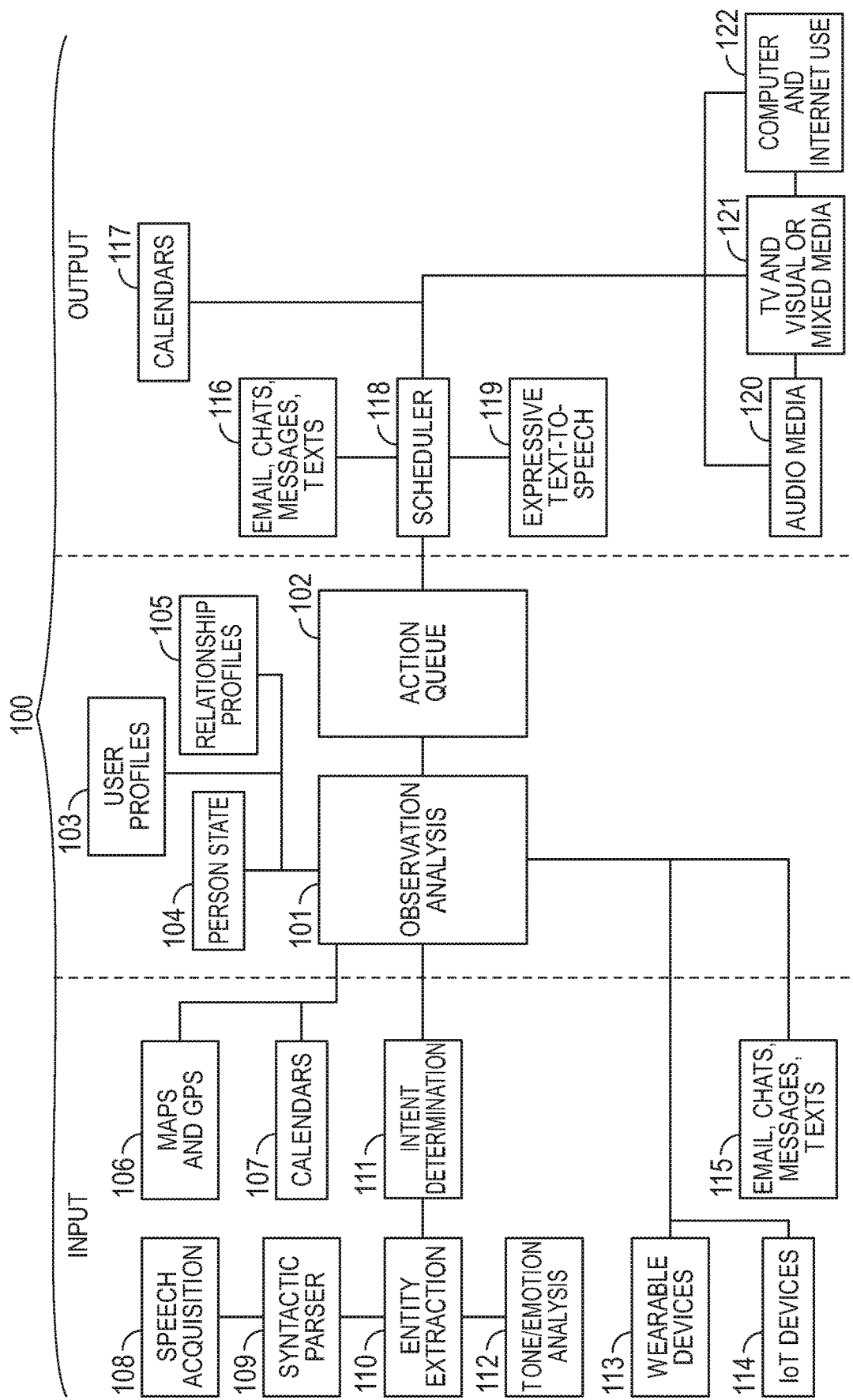
FIG. 1 depicts a system for providing a digital assistant, according to one embodiment described herein.

Generally, the present disclosure describes techniques for providing a virtual assistant for multiple users. One embodiment receives a multitude of information from a variety of users, analyzes such information in combination with historical information about the users, predefined data, patterns, routines, and other information, and provides intelligent and context-specific prompts and other interactions to the variety of users, often simultaneously. These interactions are further unique to each situation and each user, and allow for a more dynamic and useful intelligent assistant.

One embodiment provides an electronic device configured with computer program code that, when executed, performs an operation that includes collecting information, using one or more input sensor devices, about the plurality of users within a physical environment. The operation further includes analyzing the collected information to determine a present situational context for the plurality of users that are currently present within the physical environment. The operation includes determining an action to perform based on the determined present situational context and executing the determined action using the one or more output devices.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, the intelligent assistant may access applications or related data available in the cloud. For example, the system could execute on a computing system in the cloud and store a variety of observed information about the various users and context at a storage location in the cloud. Doing so allows the intelligent assistant to access this information from any computing system attached to a network connected to the cloud (e.g., the Internet), and thereby operate on a user's personal devices or any other computing device.

Embodiments described herein can serve as a personal assistant to multiple users simultaneously. In some embodiments, all of the users may be a single family unit. Alternatively, the user group could include friends, babysitters or other caregivers, yard workers or gardeners, other help staff, extended family, etc. In some embodiments, the assistant may be configured by the users to understand the relationship between each user. For example, a user may manually use an interface that allows him or her to add new users, give each user a name, and define the relationship between that user and any other users. Additionally, the system may allow a user to orally give this information to the system, or communicate this information in any other appropriate way.

FIG. 1 depicts one architecture of a system 100 for providing a digital assistant in which embodiments of the present disclosure may be implemented. This figure in no way limits or is intended to limit the scope of the present disclosure. The system 100 includes an Observation Analysis 101 module communicatively linked to an Action Queue 102. The Observation Analysis 101 module is additionally linked to a variety of inputs, including a Maps and GPS 106 module which provide location data, a Calendars 107 module, Wearable Devices 113, Internet of Things (IoT) Devices 114, and Email, Chats, Messages, and Texts 115. The system 100 further includes a Speech Acquisition 108 module, which is communicatively coupled to a Syntactic Parser 109. The Syntactic Parser 109 is coupled with an Entity Extraction 110 module, which is further communicatively linked to a Tone/Emotion Analysis 112 module. The Entity Extract 110 module is additionally linked to an Intent Determination 111 module, which is coupled to the Observation Analysis 101 module.

The Observation Analysis 101 module is also coupled to a Person State 104 module which provides a current "state" of each user, User Profiles 103 which store user preferences and selections, and Relationship Profiles 105 which define the relationships between each of the users. The Observation Analysis 101 module uses these inputs, along with other inputs not shown, to determine the current context of a given situation. Based on this context and the User Profiles 103, Person State 104, and Relationship Profiles 105, the Observation Analysis 101 module determines an appropriate action in order to best serve as a personal assistant to the users.

The Action Queue 102 handles the execution of the actions that are determined by the Observation Analysis 101. The Action Queue is connected to a variety of devices and modules, including a Scheduler 118 which actually implements the actions and orders them. The Scheduler 118 is coupled to Email, Chats, Messages, and Texts 116 as well as an Expressive Text-To-Speech 119 module. The Scheduler 119 is further connected to Calendars 117 for the users, Audio Media 120 such as songs and other audio cues, Tv and Visual or Mixed Media 121 like games and video, and to Computer and Internet Use 122.

One example of an interaction between users and a particular embodiment of the system 100 is as follows. The Speech Acquisition 108 module receives speech input from a user. This information is handed to the Syntactic Parser 109, which determines that the user said "Where is dad?" The Entity Extraction 110 module identifies "dad" as a name, and the Tone/Emotion Analysis 112 module determines that the speaking user is not worried, but is merely curious. The Intent Determination 111 module determines that the user would like to know where "dad" is, and sends this information to the Observation Analysis 101. The Observation Analysis 101 accesses information from User Profiles 103 and Relationship Profiles 105 to determine which user "dad" is, and accesses Maps and GPS 106 to determine where the "dad" user is. If GPS is other location information is unavailable, the Observation Analysis 101 module may supplement its information with Wearable Devices 113, IoT Devices 114, or Email, Chats, Messages, and Texts 115 to help determine where "dad" is. Upon determining a location or guess, the Observation Analysis 101 sends this determination to the Action Queue 102, which in turn sends it to the Scheduler 118 when appropriate. Finally, the system 100 can respond to the initial question through the Expressive Text-to-Speech 119 module ("Dad is on the way home, Billy!"). Depending on the decided action, the system 100 could also send a text through the Email, Chats, Messages, and Texts 116 module, update a Calendar 117, or any other output. The foregoing example is non-limiting, and is meant merely to describe one possible embodiment of the present invention.

Figure 2:
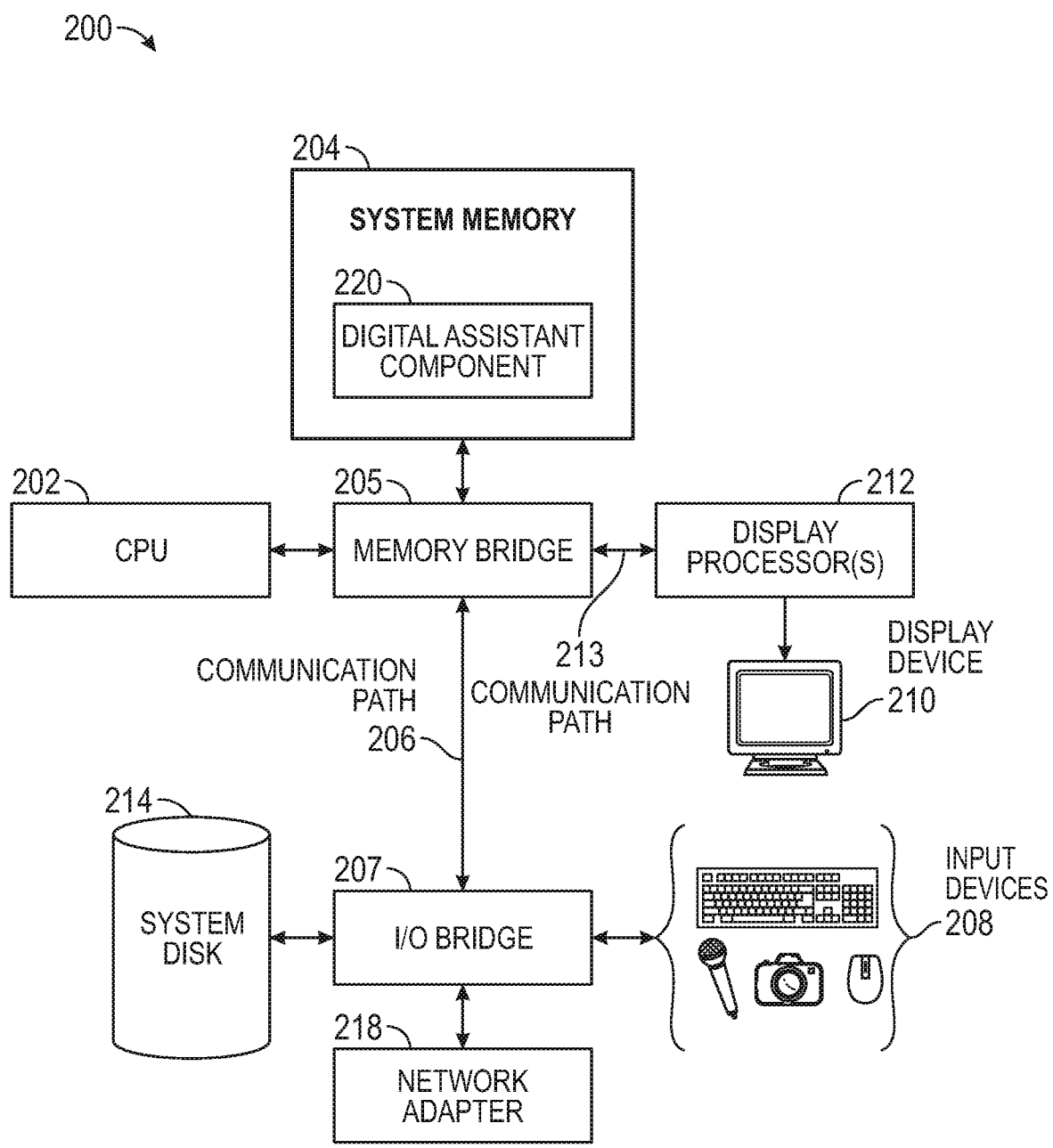
FIG. 2 is another system diagram of a system in which embodiments of the present invention may be implemented.

FIG. 2 depicts one architecture of a system 200 within which embodiments of the present invention may be implemented. This figure in no way limits or is intended to limit the scope of the present disclosure. System 200 may be a personal computer, video game console, personal digital assistant, dedicated computing device, or any other device suitable for practicing one or more embodiments of the present disclosure.

As shown, system 200 includes a central processing unit (CPU) 202 and a system memory 204 communicating via a bus path that may include a memory bridge 205. CPU 202 includes one or more processing cores, and, in operation, CPU 202 is the master processor of system 200, controlling and coordinating operations of other system components. System memory 204 stores software applications and data for use by CPU 202. CPU 202 runs software applications and optionally an operating system. Memory bridge 205, which may be, e.g., a Northbridge chip, is connected via a bus or other communication path (e.g., a HyperTransport link) to an I/O (input/output) bridge 207. I/O bridge 207, which may be, e.g., a Southbridge chip, receives user input from one or more user input devices 208 (e.g., keyboard, mouse, joystick, digitizer tablets, touch pads, touch screens, still or video cameras, motion sensors, microphones, GPS devices, etc.) and forwards the input to CPU 202 via memory bridge 205. In one embodiment, the computer system 200 is configured to implement an intelligent and context-sensitive personal assistant for multiple users, as further described herein.

A display processor 212 is coupled to memory bridge 205 via a bus or other communication path (e.g., a PCI Express, Accelerated Graphics Port, or HyperTransport link); in one embodiment display processor 212 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 204.

Display processor 212 periodically delivers pixels to a display device 210 (e.g., a screen or conventional CRT, plasma, OLED, SED or LCD based monitor or television). Additionally, display processor 212 may output pixels to film recorders adapted to reproduce computer generated images on photographic film. Display processor 212 can provide display device 210 with an analog or digital signal.

A system disk 214 is also connected to I/O bridge 207 and may be configured to store content and applications and data for use by CPU 202 and display processor 212. System disk 214 provides non-volatile storage for applications and data and may include fixed or removable hard disk drives, flash memory devices, and CD-ROM, DVD-ROM, Blu-ray, HD-DVD, or other magnetic, optical, or solid state storage devices.

Other components (not shown), including USB or other port connections, film recording devices, and the like, may also be connected to I/O bridge 207. For example, an audio processor may be used to generate analog or digital audio output from instructions and/or data provided by CPU 202, system memory 204, or system disk 214. Communication paths interconnecting the various components in FIG. 2 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 212 incorporates circuitry optimized for graphics and video processing, including, for example, video output circuitry, and constitutes a graphics processing unit (GPU). In another embodiment, display processor 212 incorporates circuitry optimized for general purpose processing. In yet another embodiment, display processor 212 may be integrated with one or more other system elements, such as the memory bridge 205, CPU 202, and I/O bridge 207 to form a system on chip (SoC). In still further embodiments, display processor 212 is omitted and software executed by CPU 202 performs the functions of display processor 212.

Pixel data can be provided to display processor 212 directly from CPU 202. In some embodiments of the present invention, instructions and/or data representing a scene are provided to a render farm or a set of server computers, each similar to system 200, via network adapter 218 or system disk 214. The render farm generates one or more rendered images of the scene using the provided instructions and/or data. These rendered images may be stored on computer-readable media in a digital format and optionally returned to system 200 for display. Similarly, stereo image pairs or multiview autostereoscopic images processed by display processor 212 may be output to other systems for display, stored in system disk 214, or stored on computer-readable media in a digital format.

Alternatively, CPU 202 provides display processor 212 with data and/or instructions defining the desired output images, from which display processor 212 generates the pixel data of one or more output images, including characterizing and/or adjusting the offset between stereo image pairs, in the case of stereoscopic images, or generating and interleaving multiple views, in the case of multiview autostereoscopic images. The data and/or instructions defining the desired output images can be stored in system memory 204 or graphics memory within display processor 212. For example, CPU 202 could execute a client media player application (not shown) that receives a media stream from a content provider, and transmits the media stream to the display processor 212 for viewing on the display device 210. In an embodiment, display processor 212 includes 3D rendering capabilities for generating pixel data for output images from instructions and data defining the geometry, lighting shading, texturing, motion, and/or camera parameters for a scene. Display processor 212 can further include one or more programmable execution units capable of executing shader programs, tone mapping programs, and the like.

CPU 202, render farm, and/or display processor 212 can employ any surface or volume rendering technique known in the art to create one or more rendered images from the provided data and instructions, including rasterization, scan-line rendering REYES or micropolygon rendering, ray casting, ray tracing, image-based rendering techniques, and/or combinations of these and any other rendering or image processing techniques known in the art.

As shown, the memory 204 includes a digital assistant component 220. Generally, the digital assistant component 220 is configured to provide a digital assistant service that provides useful and entertaining content for a group of individuals. In one embodiment, the digital assistant component 220 represents the software components of the system 100 shown in FIG. 1 and discussed above.

For example, the digital assistant component 220 could collect information, using one or more input sensor devices 208, about the plurality of users within a physical environment. The digital assistant component 220 could then analyze the collected information to determine a present situational context for the plurality of users that are currently present within the physical environment. For example, the digital assistant component 220 could determine that the users are currently having dinner within the physical environment. The digital assistant component 220 could determine an action to perform based on the determined present situational context. For instance, the digital assistant component 220 could consider a level of social interaction currently occurring within the physical environment amongst a plurality of users.

For example, upon determining that the level of social interaction is low when there is relatively little conversation occurring between the users (e.g., the current level of conversation is less than a predefined threshold level expressed in a predefined rule), the digital assistant component 220 could determine to perform an action based on the current situational context. As another example, the digital assistant component 220 could analyze video data captured within the physical environment to determine a level of activity of the users and could perform an action, based on the determined level of activity (e.g., upon determining that the users are relatively inactive, the digital assistant component 220 could initiate the playback of a game that involves physical activity).

In a particular embodiment, the digital assistant component 220 could analyze video data captured within the physical environment to determine a level of conversation amongst one or more users (e.g., verbal communication, sign language, etc.). For example, the digital assistant component 220 could maintain user profile data that specifies that a particular user is hearing impaired and frequently converses using sign language, and upon determining that the particular user is relatively quiet, the digital assistant component 220 could perform one or more actions to help stimulate conversation within the physical environment. For example, for the particular user who is hearing impaired, the digital assistant component 220 could project a holographic projection of a virtual character (e.g., a virtual representation of a fictional character determined to be the particular user's favorite fictional character, based on an analysis of a user profile for the particular user) animated in such a way as to perform sign language to play an interactive game.

In one embodiment, the digital assistant component 220 could perform an action that includes initiating playback of an interactive game with the plurality of users. For example, the digital assistant component 220 could retrieve an instance of audio data that represents dialogue asking the users if they would like to play a game. As a specific example, the digital assistant component 220 could determine a preferred fictional character for one of the users by accessing a user profile, and could retrieve an instance of audio data that represents dialogue read in the voice of the preferred fictional character. The digital assistant component 220 could then execute the determined action using the one or more output devices 210. As an example, the digital assistant component 220 could output audio data reading the dialogue, and could further output a holographic projection using one or more holographic projection devices that is animated as performing sign language corresponding to the dialogue. Doing so provides a useful and entertaining digital assistant service for the plurality of users.

In some embodiments, the digital assistant component 220 can be configured to learn about the relationship between various users or even add new users to the system by analyzing all of the information which is provided to it, actively or passively, over time. For example, the digital assistant component 220 can monitor user behavior and conversations throughout a typical day and could determine that some users are routinely sent to bed at a particular time each evening. As a result, the digital assistant component 220 could determine that these users are children of the users who send them to bed. Additionally, the digital assistant component 220 may monitor user speech by analyzing audio data or texts and other messages sent by each user, and determine that users are referring to each other by name or referring to each other as "dad" and "mom" and associate each user with that name. The digital assistant component 220 may also determine that two users refer to each other as "dear," "sweetheart," or other pet names and determine that the users are dating or married.

Further, the digital assistant component 220 may detect that a new individual is often with established users based on facial recognition, voice recognition, or any other method of identifying an individual. The digital assistant component 220 may then create a user profile for this new individual and determine his or her relationship, or notify an existing user and prompt them for more information about the new user. Additionally, the existing users can prevent the digital assistant component 220 from automatically adding new users, and can remove existing users easily. In such an embodiment, the digital assistant component 220 preferably includes a privacy policy that requires the user to explicitly approve of certain forms of information gathering before they are used. For example, a user may refuse to allow the assistant to access his or her texts or emails, or may indicate that the system may only monitor speech data during certain times, in certain rooms, or not at all. In this way, each user is assured that the system only collects information that they knowingly allow access to, and user privacy is maintained. Additionally, if a user is a child, his or her guardian or parent may be capable of setting privacy settings for the child as well as for themselves.

The digital assistant component 220 may be given a name by the manufacturer, or an end-user might be able to configure it with a name. In this way, users are able to refer to the digital assistant component 220 verbally by name and have it recognize that they are talking to it. In some embodiments, each user may assign their own unique name to the digital assistant component 220. For example, one user may prefer to refer to the assistant as "Sam" while another prefers "Samantha." Of course, the names need not be related, and could be entirely different. Additionally, it may be preferable to the users that some users refer to the digital assistant component 220 as "Sir" or "Ma'am," or by some other phrase or name. In some embodiments, in addition to responding to a unique name from each user, the system may further be customizable such that each user can assign a different age, gender, nationality, accent, speech speed, and language to the system. For example, one user may interact with the system as if it was a 50-year old woman from Glasgow, while another may interact with the assistant as a 25 year-old man from Shanghai. In this way, each user receives ultimate customizability and the system serves each user in a personalized and unique manner.

As discussed herein, the system may receive information from the users through a large variety of methods. For example, the system may analyze the speech of individual users, emails, texts, messages, or chats between users and third-parties, physical location of the users, calendar events, and any other suitable information. Additionally, the system may receive information from wearable devices or an internet-of-things device. This information may include things like heart rate, breathing rate, stress level, or any other useful metric. In one embodiment, the system includes a privacy policy that requires the user to explicitly approve of certain forms of information gathering before they are used. In this way, each user is assured that the system only collects information that they knowingly allow access to, and user privacy is maintained.

The digital assistant component 220 may also be configured with preferences for each user, and treat each one differently. Additionally, the digital assistant component 220 may respond differently based on the time of day or the context of what is currently occurring. For example, in the morning or late evening the system may speak softly and gently with the users, but if the user is running late for work or school, it may become more forceful or urgent in its actions. Additionally, the digital assistant component 220 may respond differently based on the age of the user it is interacting with. For example, an adult user may need only minor prompts, while a child may require more authoritative direction.

Some embodiments of the present invention may keep track of the location various users through a variety of ways. For example, each user might have a GPS device associated with them, and the system may periodically poll each device to learn the current location of each family member. This device could be a cell phone, purpose-built GPS device, a wearable GPS, or any other suitable device. The location of each user may also be determined through other means, including cell tower location. Additionally, in some embodiments each user's location within a house or building may be tracked through other more accurate means, such as through motion detectors, cameras, RFID tracking, etc. In this way, the digital assistant component 220 may know not only where each user is in the broader world, but also in which part of the house or building each user is when they are at home. This location data allows the assistant to more accurately target assistance to individual users, and more readily decide which prompt or assistance may be necessary at any given time. In these embodiments, the digital assistant component 220 preferably includes a privacy policy that requires the user to explicitly approve the use of GPS or other location data before the assistant has access to it. For example, a user may activate and deactivate location data at will, or may have it automatically enabled or disabled at various times. Additionally, in some embodiments, the user may allow the digital assistant component 220 to track his or her location while they are home, but not while they are away from home. Alternatively, the user may allow the digital assistant component 220 to track them at certain locations, but require that all location tracking cease if they enter or exit a defined area. In this way, each user is assured that the digital assistant component 220 only collects location information that they knowingly allow access to, and user privacy is maintained.

In a preferred embodiment, the digital assistant component 220 includes one or more speech acquisition modules. A speech acquisition module allows users to interact with the system verbally, and additionally may be configured to allow the digital assistant component 220 to listen and learn from users even when they are not speaking directly to the system. The speech acquisition module may be coupled with a privacy policy that allows users to control when, or even if, the system monitors and collects audio. For example, the digital assistant component 220 may be configured to begin collecting and storing audio information only upon determining that a user is addressing the system directly. Such determination could be through a button press, recognizing the name of the digital assistant component 220 being spoken, or any other method. In such an embodiment, the digital assistant component 220 may still analyze audio data to determine whether it is being addressed, but has safeguards in place to ensure the data is destroyed and the user's privacy is preserved. The speech acquisition module is preferably linked to a syntactic parser that can parse the acquired speech to determine what the user meant. Additionally, it may be useful to communicatively link these modules to an entity extraction module that can identify and recognize names, places, events, times, and other similar entities. In this way, the digital assistant component 220 can more easily link concepts together even when they are spoken about at different times. For example, User 1 may instruct the digital assistant component 220 that they are going to dinner tonight with Susan. If the digital assistant component 220 later determines that another user is planning dinner, the digital assistant component 220 may interject to inform the other user that User 1 already has plans with Susan, based on recognizing that both users were talking about dinner for the same night.

In one embodiment, the speech acquisition module is further linked to a tone or emotion analysis module, which can detect the tone that a user is using when he or she speaks. This tone analysis may inform the system of the user's current emotional state. Additionally, this module could allow the system to understand that a user is in a hurry, or is angry, upset, excited, frustrated, or any other emotion that might be useful. The system may adjust its actions based on this analysis. For example, the digital assistant component 220 might decide to postpone informing the user about something, or may provide a song, video, game, or other media to the user in an effort to soothe him or her. Additionally, the module may be linked to an intent determination module that can better understand the intent of a user and therefore provide better assistance. Of course, in some embodiments a user may disable tone and emotion analysis, and the system will respond as if the user is calm and collected regardless of their current emotional state.

In some embodiments, the digital assistant component 220 has access to one or more user's emails, texts, or other messages in order to better predict and respond to the needs of the users. For example, the digital assistant component 220 might be configured to recognize names, places, events, or other things in text similarly to how it may identify such entities in speech, and may respond to recognizing these entities in a similar fashion. In such an embodiment, the digital assistant component 220 preferably includes a privacy policy that requires the user to give explicit permission before it may access such information. For example, a user may refuse to allow the digital assistant component 220 to access his or her texts or emails, or may indicate that the system may only monitor textual data during certain times or from certain people. In this way, each user is assured that the digital assistant component 220 only collects information that they knowingly allow access to, and user privacy is maintained. Additionally, the digital assistant component 220 may be designed to allow a user to send a message directly to the assistant itself, instructing it on what it should do. For example, a parent who is running late at work might email or text the system itself and tell it to inform the rest of the family that she will be home late. The digital assistant component 220 might then inform each of the family members, or take another appropriate action. If a family member is home, the digital assistant component 220 might use a speaker in the same room as each user and verbally tell them about the parent being late. Additionally, the digital assistant component 220 might send a text or email to other users, or may simply adjust the time of an event, or take any other appropriate action. In some embodiments, the digital assistant component 220 is configured to call one or more users on the phone to keep them up to date.

The digital assistant component 220 may interact and provide output to the users in a variety of ways. These may include verbal prompts, songs, other audio, video, games, or other media. Additionally, the digital assistant component 220 may be configured to adjust or provide feedback to a wearable device or an internet-of-things device, or may send an email or message directly to a user. In some embodiments, the digital assistant component 220 is further configured to adjust a user's access to the internet, television, or subscription services. For example, a parent may request that a child's access to an online video streaming service be restricted due on bad behavior, or that it be disabled past a certain time. Similarly, a child's internet or computer access may be restricted or filtered. For example, the system may modify preferences for a certain device, which can set time limits for particular applications or websites, and can filter content.

In a preferred embodiment, if the digital assistant component 220 decides to interact with the users verbally, it uses an expressive text-to-speech module to do so. Some users may be more comfortable with oral guidance rather than text-based assistance, or may be otherwise unable or unwilling to receive guidance in another way. In some embodiments, the expressive text-to-speech module has one voice which it uses at all times, but in other embodiments each user may be able to configure the system to speak to them in a unique voice.

In one embodiment, the digital assistant component 220 may store a user profile specifying a "person state" for each user. This person state could be based on a user informing the digital assistant component 220 of the state of themselves or another user, or could be based on observations and information received by the system, such as the user's tone of voice, location, or other information. In some embodiments, a user's "person state" includes information such as their current physical location and physical wellbeing including heartrate, breathing rate, stress levels, and whether or not they are sick. Additionally, the person state may include information about whether an individual is available or whether they are asleep, at work, or otherwise occupied. In some embodiments, a user's "person state" further includes information about their mental and emotional state. For example, the digital assistant component 220 may store information about whether a user is currently angry or upset, or whether they are preoccupied or worried. In these embodiments, the digital assistant component 220 preferably includes a privacy policy that allows each user to adjust what information is stored in their person state. For example, a user may refuse to allow the assistant to store information about their mood or may indicate that they do not want any information whatsoever to be stored in their person state. Any information stored in this "person state" is of course secured and protected, but each user may nevertheless be entitled to decide and control the contents and type of information contained in their own records. In this way, each user is assured that the system only collects information that they knowingly allow access to, and user privacy is maintained.

In some embodiments, the digital assistant component 220 is configured to use this "person state" when determining what sort of prompt or output is appropriate for each user at any given time. For example, if a user's person state indicates that they are currently angry, the system may decide to use a gentler or more soothing approach. Additionally, if a user's person state indicates that they are busy or at work, the system may refrain from providing verbal prompts and may provide only silent output to the user, or may provide no output at all. In another embodiment, if a child's person state indicates that they are upset, the system may provide a prompt to a parent or caregiver.

It will be appreciated that the system shown herein is illustrative and that variations and modifications are possible. The connection topology, including the number and arrangement of bridges, may be modified as desired. For instance, in some embodiments, system memory 204 is connected to CPU 202 directly rather than through a bridge, and other devices communicate with system memory 204 via memory bridge 205 and CPU 202. In other alternative topologies display processor 212 is connected to I/O bridge 207 or directly to CPU 202, rather than to memory bridge 205. In still other embodiments, I/O bridge 207 and memory bridge 205 might be integrated into a single chip. The particular components shown herein are optional; for instance, any number of add-in cards or peripheral devices might be supported.

Figure 3:
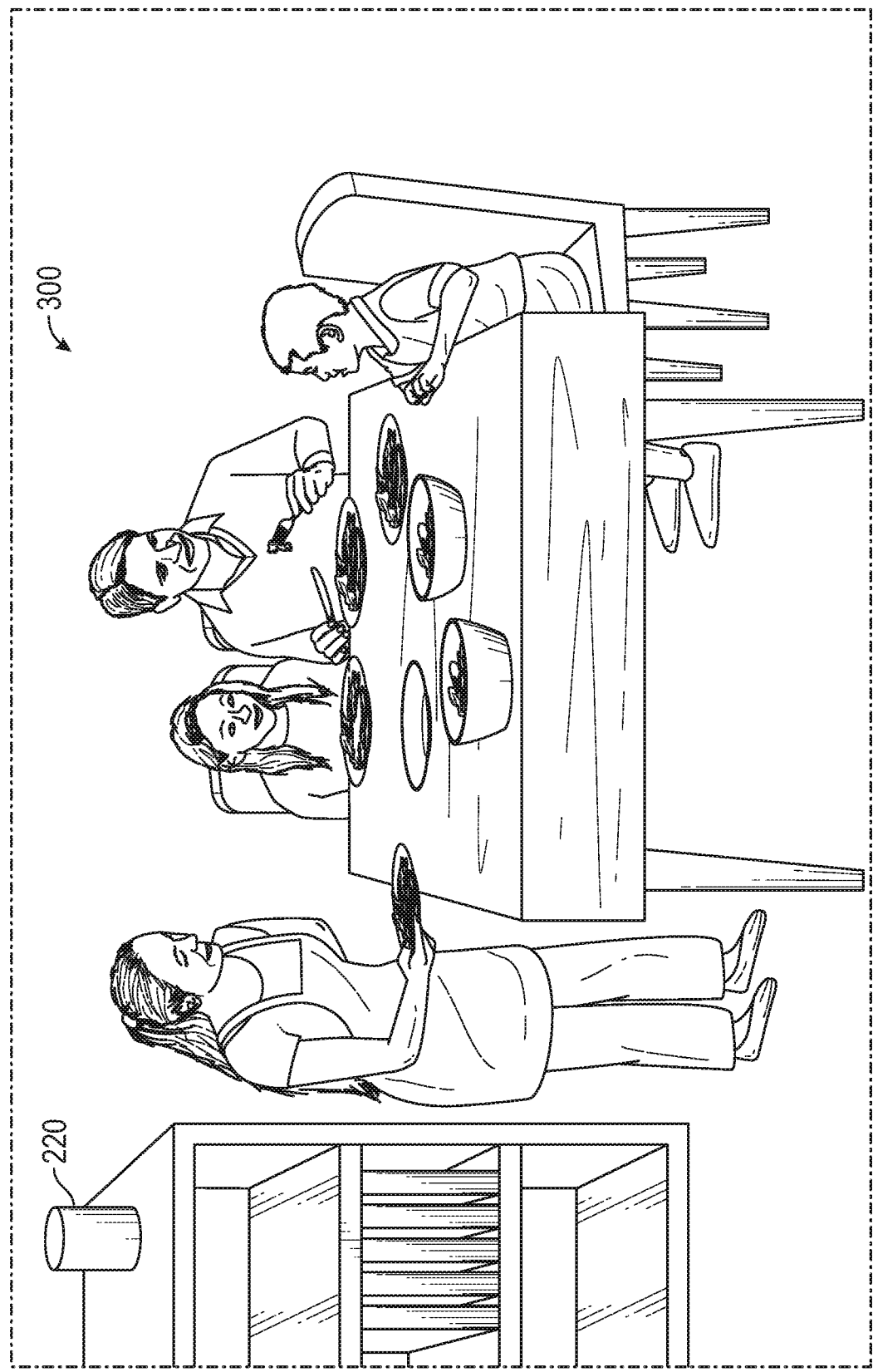
FIG. 3 illustrates a plurality of users within a home environment configured with a digital assistant component, according to one embodiment described herein.

FIG. 3 illustrates a plurality of users within a home environment configured with a digital assistant component, according to one embodiment described herein. As shown, the environment 300 includes a plurality of users and an electronic device configured with the digital assistant component 220. In the depicted embodiment, the users are currently sitting down for a meal. The digital assistant component 220 could monitor the conversations of the users (e.g., using one or more microphone devices) and could analyze sound data collected from the conversations to determine a current situational context. For example, the digital assistant component 220 could analyze collected sound data using a speech-to-text analysis module and could determine that one of the users spoke the phrase "Get ready for dinner!" Based on this, the digital assistant component 220 could analyze the phrase and could determine that the word "dinner" corresponds to a predefined situational context (e.g., a meal).

The digital assistant component 220 could then access a repository (e.g., a remote database) to determine one or more actions corresponding to the situational context. For example, the digital assistant component 220 could determine one or more interactive games that can be played while the family is sitting down to dinner. In one embodiment, the digital assistant component 220 is configured to consider a user profile for one or more of the users, specifying preferences of the one or more users. For example, the user profile could specify that one of the children present within the physical environment 300 has a particular favorite fictional character. As a result, the digital assistant component 220 could access a text-to-speech module corresponding to the favorite fictional character, in order to read the dialogue for the interactive game using a voice effect that corresponds to the fictional character.

In one embodiment of the present invention, the may learn about the family's routine and schedule over time. This learning could be based on tracking the locations of each individual in the family over time, but the digital assistant component 220 could also refer to calendar events for one or more of the family members. As discussed above, as in many embodiments the digital assistant component 220 is preferably configured with a privacy policy that allows users to restrict what data the system monitors. In such an embodiment, the digital assistant component 220 cannot learn a family routine or schedule unless the users explicitly give permission to track such information and establish the schedule. Additionally, the digital assistant component 220 may be taught about the family's schedule orally, either by hearing a family member discussing an event or routine, or by being verbally instructed by a user that a certain event will occur. Of course, a user could also manually enter a schedule for themselves or the entire family as well, or the digital assistant component 220 may learn about the schedule or event based on any of the input information discussed herein. Ultimately, the digital assistant component 220 may be configured to learn the schedules of the family members regardless of whether a user intends to create a formal event or not, as long as the user's privacy settings allow automatic schedule determination.

The events that the system is taught could be of a type that is repeated over time, for example a daily meal, a daily bedtime for the children or a weekly trip to the grocery store. Other periods of time between repetitions are of course within the scope of the present disclosure. Other common examples could include learning a time when certain family members need to leave the house in order to make it to work or school each day, learning a time when family members return home for the day, and learning about a rough breakfast or dinner schedule each day. Additionally, these events could be unique for each individual family member, or there could be events that correspond to more than one family member. Some events may include the entire family, and may even include additional users beyond family members, such as friends or caregivers. Additionally, the system could learn of a one-time event rather than a repeating event and respond accordingly.

Regardless of how the digital assistant component 220 determines that an event is upcoming, the digital assistant component 220 may be configured to aid with key transition times during the day based on the family schedule. For example, the digital assistant component 220 may understand that certain users need to leave the house in the morning at a certain time. If those users are children, the digital assistant component 220 may provide some direction, sing a song, play specific audio, show video or other entertaining content, provide a game, or some other content to help motivate the children to put their shoes on and get ready to go. Once a parent user sees that the children have finished with that task, he or she may confirm that with the digital assistant component 220, for example by pressing a button or verbally saying "thank you" to it. If the digital assistant component 220 determines that an adult user needs to begin getting ready or perform some task to leave on time, it may prompt them differently. For example, the digital assistant component 220 might simply verbally remind the user that they need to brush their teeth soon or get into the shower if they want to be on time. The digital assistant component 220 may also be configured to provide an alarm to individual users to wake them up in the morning as a transition into the day. This alarm could be personalized with a song, voice, or other action. In particular events, the digital assistant component 220 could initiate the playback of an interactive game or song, in order to encourage the user to complete a certain task (e.g., getting dressed, brushing her teeth, etc.) and in order to help make the task more fun and enjoyable for the user.

In some embodiments, the digital assistant component 220 may decide to initiate the transition based not only on the current time, but also on other factors. For example, the digital assistant component 220 may determine that traffic is particularly bad one morning, and decide to prompt the transition earlier than it normally would so that the users are still on time. If the transition prompt is an alarm to wake up, a user may configure the digital assistant component 220 to never wake him or her before a certain time, or the digital assistant component 220 may decide to use a more gentle alarm than usual if the time is earlier. Additionally, the digital assistant component 220 may decide to use a more aggressive alarm, such as by increasing the volume or changing the pitch, if it notices that a user has still not gotten out of bed despite prior prompts.

In some embodiments, the digital assistant component 220 may be aware of how long a transition will take, and base its prompts on that information and on user preferences. For example, a user may inform the digital assistant component 220 that it will take them a certain amount of time to be ready to go from when they wake up. Additionally, the digital assistant component 220 may learn through historical data about how long a transition takes. In one embodiment, the digital assistant component 220 may predict how long a transition should take and prompt the users accordingly. For example, the digital assistant component 220 may estimate how much longer it will be until dinner is ready, and begin the transition to dinner early enough to ensure that all users are ready on time, but late enough that no users are ready too early. Continuing this example, the digital assistant component 220 may know that dinner will be served at roughly a certain time (based on historical data, observing the parents making dinner, or being informed by the parents) and guide the children to prepare for dinner through a brief interstitial video, song, or some other media. In this embodiment, the user experience is adjusted by the digital assistant component 220 based not only on how long the transition will take, but also based on parent-user preferences and individual preferences.

In some embodiments, the digital assistant component 220 may determine that a pre-determined schedule has been or will be deviated from, and respond accordingly. For example, the digital assistant component 220 may notice that a parent has not left work when they normally do or is stuck in traffic, and may decide to alert a nanny or other caregiver to inform them of the delay. Additionally, the digital assistant component 220 may contact the parent to request information, or otherwise facilitate communications between the caregiver and parent. In a related example, the digital assistant component 220 may inform a spouse-user that the other spouse is similarly late, or alert a parent that their children have not yet left school. Additionally, the digital assistant component 220 may be configured to alert a parent if it detects that a child has left school early, or has entered an area which he or she is not permitted to go or does not usually go. The digital assistant component 220 could recognize this deviation because it has been informed of the ordinary schedule/permissible areas, or because it has simply learned over time. The parent may configure the digital assistant component 220 to provide a verbal or textual prompt to the child to return to school or leave the area, or may reach out directly to the child for more information. Regardless of the specific implementation, the digital assistant component 220 in this embodiment may provide timely notification or prompting to an appropriate person based on determining a deviation from the norm.

In another embodiment, the digital assistant component 220 may be configured to access a repository of conversation starters, current events, discussion topics, news stories, or other information in order to spark conversation among the users. For example, during meal time the system may pose a question or topic to the family in order to generate conversation and discussion. Additionally, the digital assistant component 220 may convey recent news stories or other events to the users in order to keep them informed and allow them to discuss them. These conversation starters could similarly come at other times, whether because a user prompted the system to provide one or simply because the digital assistant component 220 has determined that one or more users might want to know of a recent event or may want to have something to discuss. The digital assistant component 220 may further limit its topic suggestions or news stories based on the users present. For example, if younger children are present the system will not attempt to prompt a discussion about foreign policy or violent crime. Similarly, the digital assistant component 220 may be configured to avoid childish topics when only adults are present.

Generally, the digital assistant component 220 can continuously monitor data collected from one or more microphone devices to determine a level of conversation amongst the users in the physical environment. If the conversation starter has failed to initiate conversation, or if the users request a different topic, the digital assistant component 220 can provide a new one and may further adjust its future topic selection based on this failure. Additionally, once a conversation has begun, the digital assistant component 220 may refrain from interrupting with other alerts or events unless it is necessary or they are suitably important. This determination could be based on user configured preferences, or could be based on an associated "importance" with each event. Alternatively, the digital assistant component 220 could determine for itself how important the information is, and decide whether or not to interrupt.

In some embodiments, the digital assistant component 220 may be configured to respond to other inquiries from users. For example, a user may ask the system to look up a fact or event, and the system may search the internet or its own records for the answer. Additionally, the digital assistant component 220 may be configured to provide additional related information or searches that the user may find relevant or interesting based on his or her prior searches or other activity. In this embodiment, the system may be more capable of participating in and continuing conversations.

Figure 4:
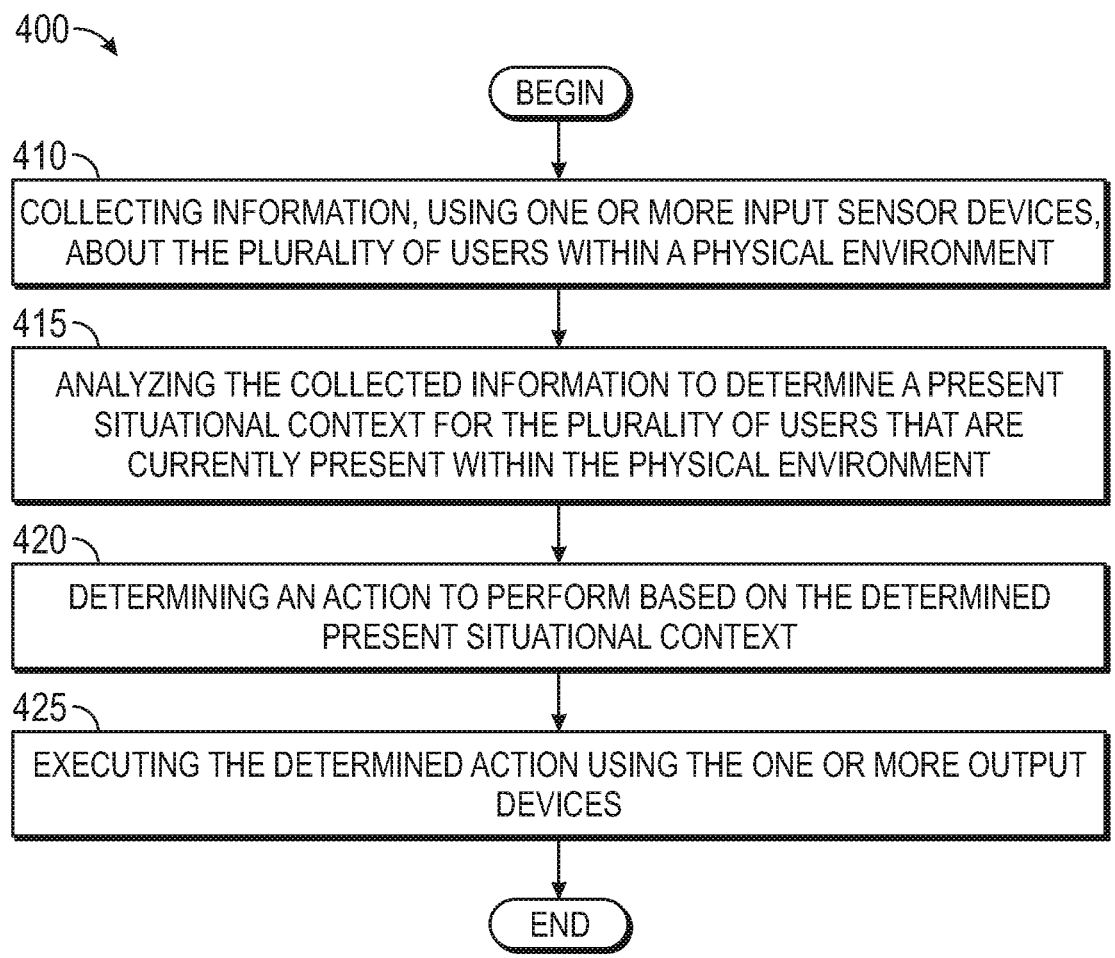
FIG. 4 is a flow diagram illustrating a method of performing an action at a digital assistant, based on a determined situational context of a plurality of users, according to one embodiment described herein.

FIG. 4 is a flow diagram illustrating a method of performing an action at a digital assistant, based on a determined situational context of a plurality of users, according to one embodiment described herein. As shown, the method 400 begins at block 410, where the digital assistant component 220 collects information, using one or more input sensor devices, about a plurality of users within a physical environment. The digital assistant component 220 analyzes the collected information to determine a present situational context for the plurality of users (block 415). For example, the digital assistant component 220 could analyze the collected sensor data to determine a current activity that the plurality of users are currently taking part in. As an example, the digital assistant component 220 could determine that the members of a family are currently having dinner within the physical environment. Additionally, the digital assistant component 220 could the identity of the users that are currently present within the physical environment.

The digital assistant component 220 determines an action to perform, based on the current situational context (block 420). For example, the digital assistant component 220 could analyze audio data collected by one or more microphone devices and could determine that the plurality of users are speaking relatively little during their dinner. As a result, the digital assistant component 220 could determine to perform an action that involves initiating the playback of a game designed to stimulate conversation amongst the plurality of users.

The digital assistant component 220 executes the determined action using one or more output devices (block 425), and the method 400 ends. For example, the digital assistant component 220 could initiate playback of a trivia game, where the digital assistant component 220 outputs audio data using one or more speaker devices, where the audio data is generated by processing a textual trivia question with a text-to-speech analysis module. The digital assistant component 220 could then analyze audio data collected using one or more microphone devices to determine whether the users have correctly answered the trivia question (e.g., by processing the audio data using a speech-to-text analysis module and comparing the resulting string with one or more predefined answers for the trivia question.)

Figure 5:
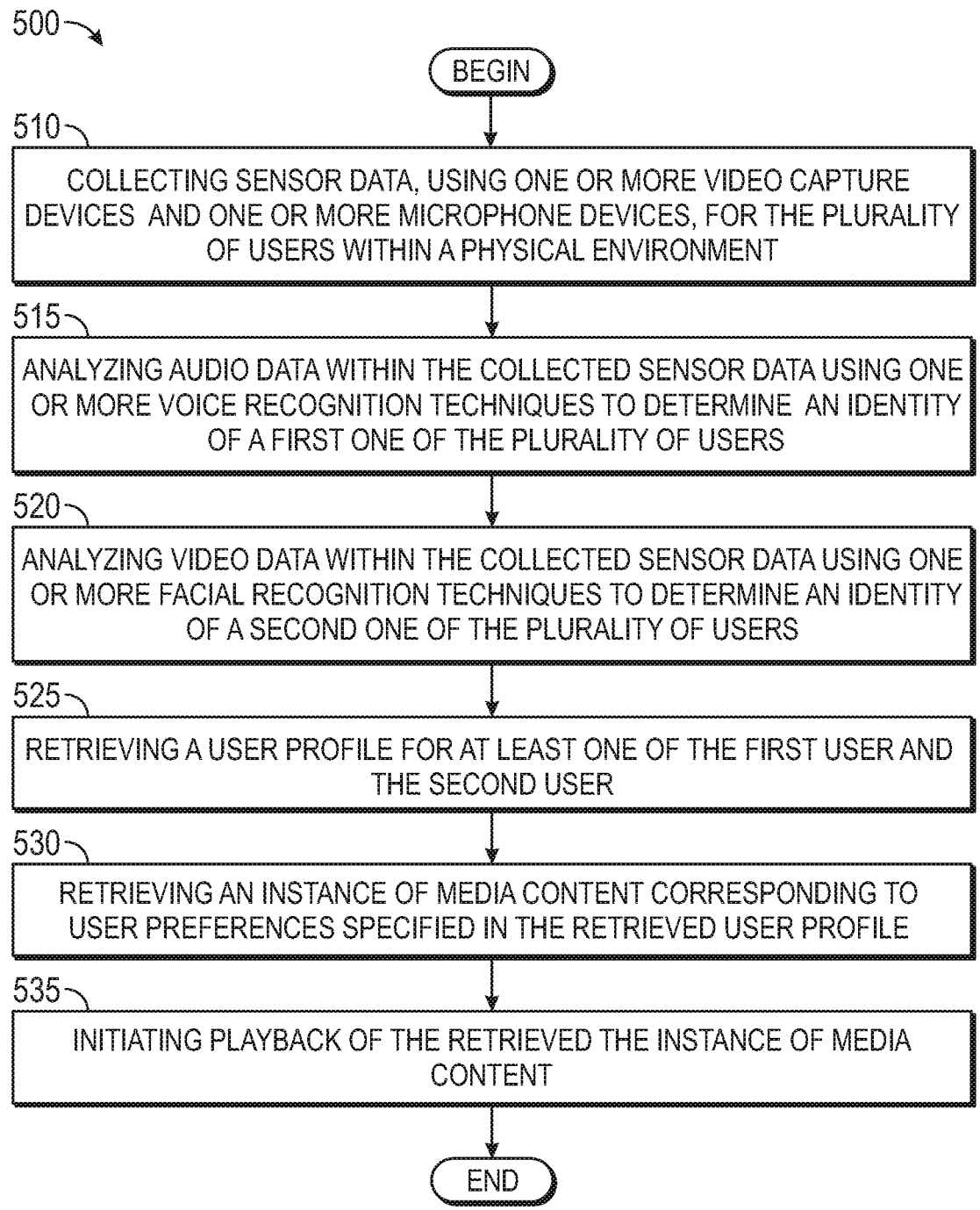
FIG. 5 is a flow diagram illustrating a method of performing an action at a digital assistant, based on user preferences for an identified user within the physical environment, according to one embodiment described herein.

FIG. 5 is a flow diagram illustrating a method of performing an action at a digital assistant, based on user preferences for an identified user within the physical environment, according to one embodiment described herein. As shown, the method 500 begins at block 510, where the digital assistant component 220 collects sensor data using one or more video capture devices and one or more microphone devices, for a plurality of users within a physical environment. The digital assistant component 220 analyzes the audio data using one or more voice recognition modules to determine an identity of a first user within the physical environment (block 515). For example, the digital assistant component 220 could maintain user profiles for each known user (e.g., the members of a family) and could store data describing attributes of each user's voice. When the digital assistant component 220 subsequently detects that a user is speaking within the physical environment (e.g., by continuously monitoring audio data collected by one or more microphone devices), the digital assistant component 220 could analyze the speech data using the one or more voice recognition modules to determine which known user is currently speaking. By doing so, the digital assistant component 220 can determine which users are currently present within the physical environment.

Additionally, in the depicted embodiment, the digital assistant component 220 analyzes video data using one or more facial recognition techniques to determine an identity of a second one of the plurality of users within the physical environment (block 520). For example, the digital assistant component 220 could store data describing the appearance of each known user within the user profile data. The digital assistant component 220 could then periodically capture images of the physical environment and, upon detecting that a user is contained within a captured image, could perform a facial recognition analysis to determine which known user is depicted within the captured image. The digital assistant component 220 could then use this information to determine which known users are currently present within the physical environment.

The digital assistant component 220 then retrieves a user profile for at least one of the first and second users (block 525). For example, upon determining that a particular user is present within the physical environment, the digital assistant component 220 could retrieve a user profile specifying preferences of the particular user. The digital assistant component 220 then retrieves an instance of media content corresponding to the user preferences within the retrieved user profile (block 530), and initiates playback of the retrieved instance of media content (block 535), and the method 500 ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An electronic device configured to provide context-based digital assistance, the electronic device comprising:
    one or more input sensor devices;
    one or more output devices;
    one or more computer processors; and
    a memory containing computer program code that, when executed by operation of the one or more computer processors, performs an operation comprising:
        collecting information, using the one or more input sensor devices, about a plurality of users of a specified social group within a physical environment, the collected information including audio data associated with at least one user of the plurality of users;
        analyzing the collected information to determine a present situational context for the plurality of users that are currently present within the physical environment, the present situational context indicating that a group activity of the specified social group is set to commence at a specified point in time, wherein the group activity comprises a domestic routine in the physical environment;
        determining an assistive action comprising an action configured to assist the at least one user to complete a preliminary activity prior to the group activity commencing at the specified point in time, the assistive action including a dialogue, wherein the assistive action is adjusted based on tone analysis of the audio data;
        determining a computer generated voice to use in outputting the dialogue, the computer generated voice corresponding to a favorite fictional character of the at least one user;
        querying a remote database to retrieve an animation of the favorite fictional character of the at least one user; and
        executing the assistive action, which includes outputting, as part of an interactive game, the animation using projection and in sync with outputting the dialogue using the computer generated voice, wherein the animation and the dialogue are output via the one or more output devices.

2. The electronic device of claim 1, wherein the assistive action is determined based on a user profile specifying user preferences.

3. The electronic device of claim 1, wherein the one or more input sensor devices comprise at least one of a camera or a microphone.

4. The electronic device of claim 1, wherein the one or more output devices comprise a speaker, a video projector, or a holographic projector.

5. The electronic device of claim 1, the operation further comprising:
  determining an identity of each of the plurality of users, by analyzing the collected information in view of predefined data corresponding to the plurality of users.

6. The electronic device of claim 5, wherein the one or more input sensor devices comprise one or more microphones, wherein the collected information comprises audio data collected using the one or more microphones, the audio data including the audio data associated with the at least one user, and wherein determining the identity of each of the plurality of users comprises:
  analyzing the collected audio data using one or more voice recognition techniques to determine whether the audio data corresponds to a first user profile of a plurality of user profiles.

7. The electronic device of claim 6, wherein determining the identity of each of the plurality of users further comprises:
  upon determining that the audio data corresponds to the first user profile, determining that a user matching the first user profile is currently present within the physical environment.

8. The electronic device of claim 5, wherein the one or more input sensor devices comprise one or more video capture devices, wherein the collected information comprises video data collected using the one or more video capture devices, and wherein determining the identity of each of the plurality of users comprises:
  analyzing the collected video data using one or more facial recognition techniques to determine whether the collected video data corresponds to a second user profile of a plurality of user profiles.

9. The electronic device of claim 8, wherein determining the identity of each of the plurality of users further comprises:
  upon determining that the collected video data corresponds to the second user profile, determining that a user matching the second user profile is currently present within the physical environment.

10. The electronic device of claim 1, wherein determining the assistive action further comprises:
  retrieving a user profile specifying user preferences; and
  generating a database query, based on at least a portion of the retrieved user profile, to retrieve one or more instances of media content from the remote database;
  wherein executing the assistive action using the one or more output devices further comprises outputting the retrieved one or more instances of media content using the one or more output devices.

11. The electronic device of claim 10,
  wherein executing the assistive action using the one or more output devices further comprises initiating playback of the interactive game using the one or more output devices.

12. The electronic device of claim 1, wherein determining the assistive action comprises:
  determining the dialogue to perform, based on the present situational context;
  determining the computer generated voice to use in outputting audio data to perform the dialogue; and
  generating audio data corresponding to the dialogue being performed using the computer generated voice;
  wherein the generated audio data is output for playback using a first output device of the one or more output devices.

13. The electronic device of claim 1, wherein the executed assistive action causes the at least one user to complete the preliminary activity prior to the group activity commencing at the specified point in time, wherein the group activity commences at the specified point in time;
  wherein the specified social group comprises a family unit, wherein the at least one user comprises a child, wherein the group activity is a first physical activity in the physical environment, wherein the preliminary activity is a second physical activity in the physical environment;
  wherein the specified point in time satisfies a predefined imminence criterion, wherein the determined assistive action is executed to facilitate timely commencement of the group activity;
  wherein the assistive action is determined based on a user profile specifying user preferences of one or more users of the plurality of users, the one or more users comprising a parent.

14. The electronic device of claim 13, wherein the one or more input sensor devices comprise a camera device and a microphone device, wherein the one or more output devices further comprise a speaker device, a video projection device, and a holographic projection device, wherein in collecting the information, only user-preapproved types of information are collected, wherein the operation further comprises:
  determining an identity of each of the plurality of users, by analyzing the collected information in view of predefined data corresponding to the plurality of users;
  wherein the collected information comprises audio data collected using one or more microphone devices, the audio data including the audio data associated with the at least one user, wherein determining the identity of each of the plurality of users further comprises:
  analyzing the collected audio data using one or more voice recognition techniques to determine whether the audio data corresponds to one of a plurality of user profiles.

15. The electronic device of claim 14, wherein the collected information further comprises video data collected using one or more video capture devices, and wherein determining the identity of each of the plurality of users further comprises:
  analyzing the collected video data using one or more facial recognition techniques to determine whether the collected video data corresponds to one of a plurality of user profiles;
  wherein determining the identity of each of the plurality of users further comprises:
  upon determining that the collected audio data and the collected video data correspond to the one of the plurality of user profiles, determining that the user matching the user profile is currently present within the physical environment.

16. The electronic device of claim 15, wherein determining the assistive action further comprises:
  generating a database query, based on at least a portion of the user profile, to retrieve one or more instances of media content from a remote database;
  wherein the interactive game comprises a trivia game and a word puzzle game;

wherein executing the determined assistive action using the one or more output devices further comprises:
outputting the retrieved one or more instances of media content using the one or more output devices; and
initiating playback of the interactive game using the one or more output devices.

17. The electronic device of claim 16, wherein the assistive action comprises a first assistive action, wherein the operation further comprises:
analyzing the information collected using the one or more input sensor devices to determine when an objective of the interactive game is completed, wherein the objective of the interactive game comprises performance of the preliminary activity by the at least one user, wherein the preliminary activity comprises the at least one user brushing teeth, getting dressed, and getting into bed; and
outputting, using the one or more output devices, a second assistive action, upon determining that the objective of the interactive game is completed by the at least one user;
wherein determining the first assistive action further comprises:
determining one or more dialogue assistive actions based on the determined present situational context; and
generating the audio data corresponding to the dialogue, based on the determined computer generated voice.

18. The electronic device of claim 17, wherein determining a computer generated voice to use comprises:
determining, based on the user profile, the favorite fictional character of the at least one user; and
determining the computer generated voice that corresponds to the favorite fictional character of the at least one user;
wherein the animation comprises a three-dimensional animation, wherein the three-dimensional animation is output for playback using a second one of the one or more output devices, wherein the second output device comprises the holographic projection device, wherein the generated audio data is output for playback using a first one of the one or more output devices.

19. A method of providing a computerized digital assistant using an electronic device, the electronic device comprising one or more input sensor devices and one or more output devices, the method comprising:
collecting information, using the one or more input sensor devices, about a plurality of users of a specified social group within a physical environment, the collected information including audio data associated with at least one user of the plurality of users;
analyzing the collected information to determine a present situational context for the plurality of users that are currently present within the physical environment, the present situational context indicating that a group activity of the specified social group is set to commence at a specified point in time, wherein the group activity comprises a domestic routine in the physical environment;
determining, an assistive action comprising an action configured to assist the at least one user to complete a preliminary activity prior to the group activity commencing at the specified point in time, the assistive action including a dialogue, wherein the assistive action is adjusted based on tone analysis of the audio data;
determining a computer generated voice to use in outputting the dialogue, the computer generated voice corresponding to a favorite fictional character of the at least one user;
querying a remote database to retrieve an animation of the favorite fictional character of the at least one user; and
executing the assistive action, which includes outputting, as part of an interactive game, the animation using projection and in sync with outputting the dialogue using the computer generated voice, wherein the animation and the dialogue are output via the one or more output devices.

20. A non-transitory computer readable medium containing computer program code that, when executed by operation of one or more computer processors, performs an operation of providing a computerized digital assistant using an electronic device, the electronic device comprising one or more input sensor devices and one or more output devices, the operation comprising:
collecting information, using the one or more input sensor devices, about a plurality of users of a specified social group within a physical environment, the collected information including audio data associated with at least one user of the plurality of users;
analyzing the collected information to determine a present situational context for the plurality of users that are currently present within the physical environment, the present situational context indicating that a group activity of the specified social group is set to commence at a specified point in time, wherein the group activity comprises a domestic routine in the physical environment;
determining an assistive action comprising an action configured to assist the at least one user to complete a preliminary activity prior to the group activity commencing at the specified point in time, the assistive action including a dialogue, wherein the assistive action is adjusted based on tone analysis of the audio data;
determining a computer generated voice to use in outputting the dialogue, the computer generated voice corresponding to a favorite fictional character of the at least one user;
querying a remote database to retrieve an animation of the favorite fictional character of the at least one user; and
executing the assistive action, which includes outputting, as part of an interactive game, the animation using projection and in sync with outputting the dialogue using the computer generated voice, wherein the animation and the dialogue are output via the one or more output devices.

* * * * *